Feb. 5, 1957    L. A. HAYES    2,779,992
CUTTING TOOL WITH REMOVABLE BIT
Filed April 14, 1954
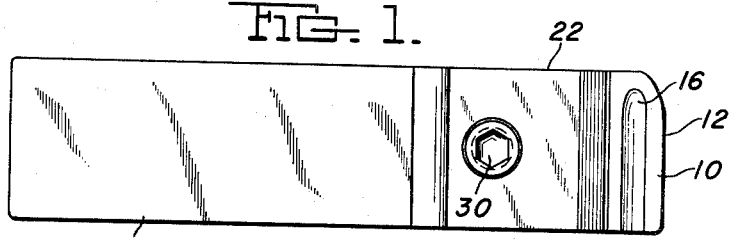
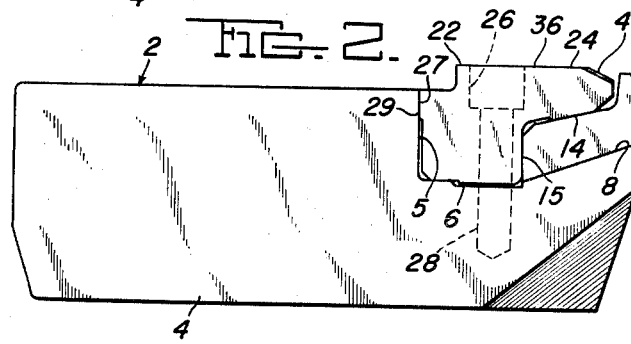
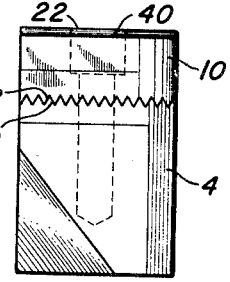
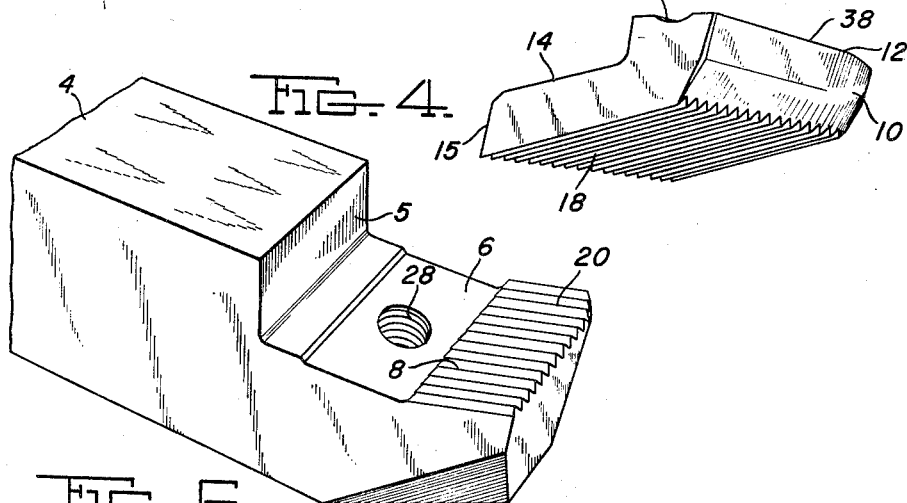
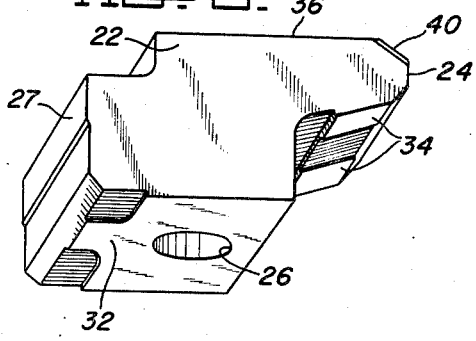
INVENTOR:
LOREN A. HAYES,
BY: Donald G. Dalton
his Attorney.

2,779,992

CUTTING TOOL WITH REMOVABLE BIT

Loren A. Hayes, Elyria, Ohio, assignor to United States Steel Corporation, a corporation of New Jersey Application April 14, 1954, Serial No. 423,017

4 Claims. (Cl. 29—96)

The present invention relates to cutting tools and more particularly to a cutting tool having a removable cutting bit.

Prior to my invention, metal cutting tools were generally comprised of a tool shank having a cutting bit cemented on one end. When the cutting bit became worn or defective, it was necessary to remove the entire tool from the metal working machine assembly so that the cutting bit could be dressed or otherwise renewed. This operation caused down-time for the machine and as a result, increased processing costs. The detrimental consequences of such an arrangement were multiplied in operations where a plurality of cutting tools are employed. One example of such a machine is the billet peeler which is used to process round steel billets prior to piercing in the manufacture of seamless steel tube.

A billet peeler of conventional design is usually provided with a rotatable cutter head having a central opening for passage of a billet, and six radially spaced cutting tools arranged around the central opening for peeling the billet as it passes therethrough. In the peeling operation, the cutting bits are subjected to considerable complex longitudinal and transverse forces when receiving, peeling and discharging the billet so that cutting bits soon become defective or worn and must be frequently replaced. Since the cutting bits were cemented to the tool shanks, the entire cutting tool had to be removed each time it was necessary to replace a worn or defective bit. Each replacement of a cutting tool was accompanied by a loss of time due to the necessity of readjusting the cutter head so that the machine would function properly when operations were resumed.

The primary object of my invention is to provide a cutting tool having a removable cutting bit affixed to the tool shank by means which are easily and quickly manipulated for installing or removing the cutting bit with no disturbance of the tool shank mounting.

Another object of the invention is to provide an improved clamping means for securing a removable cutting bit on the tool shank of a cutting tool in such a manner that the bit will not be susceptible to distortion or damage by the forces encountered in the use of the tool.

These and other objects will become more apparent after referring to the following specification and attached drawings, in which:

Figure 1 is a top plan view;

Figure 2 is a side elevational view;

Figure 3 is an elevational view of the right end of Figure 2;

Figure 4 is a perspective view of the tool with parts removed for clarity;

Figure 5 is a perspective view of the cutting bit of the tool of the invention; and Figure 6 is a perspective view of the clamp of the tool.

Referring more particularly to the drawings, reference numeral 2 designates an exemplary form of the cutting tool of my invention which includes a shank 4 having a cut out portion at one end forming a shoulder 5, a horizontal bearing surface 6, and an inclined bearing surface 8. The surface 8 is inclined at an acute angle from the longitudinal axis of the tool shank. A cutting bit 10, which may be made of high-speed tool steel or other suitable material, is disposed on the inclined bearing surface 8 with its cutting edge 12 extending transversely at the forward end of the tool shank. The cutting bit is generally L-shaped in configuration and is provided with bearing surfaces or seats 14 and 15 remote from the cutting edge 12. A transverse chip breaking groove 16 may be provided adjacent the cutting edge 12 for breaking chips of material removed by the cutting edge.

The contacting faces of the cutting bit 10 and the inclined bearing surface 8 are provided with matching longitudinal serrations 18 and 20, respectively, for preventing lateral displacement of the cutting bit relative to the tool shank.

The cutting bit is secured in position on the tool shank by means of a clamping member 22 having a projecting portion 24 extending toward the forward end of the tool shank at an angle to the longitudinal axis of the shank less than the angle of inclination of the bearing surface 8. The clamping member 22 clamps the cutting bit in position by means of the projection 24 engaging and bearing against the seat 14 of the cutting bit. The clamping member 22 is provided with a vertical bearing surface 27 remote from the projection 24 for contacting the upper portion 29 of the shoulder 5. Surfaces 15 and 27 are machined to provide complete contact between the cutting bit and the clamping member, and the clamping member and the shoulder 5, respectively, as best shown in Figure 2. The clamping member 22 has a centrally located countersunk hole 26 extending vertically therethrough, which is aligned with a threaded hole 28 in the bearing surface 6. As best shown in Figures 2 and 3, the parts are locked in place by means of a set screw 30 which passes through hole 26 and is threaded into the hole 28. The bottom surface of the clamping member is provided with a raised contact portion 32 intermediate its sides and adjacent the shoulder 5 while the bottom of the projection 24 is provided with raised contact portions 34 adjacent each side thereof to provide a three-point contact and thus assure a uniform bearing of the clamping member 22 on the shank and the cutting bit.

Although the surface 8 may be inclined at any acute angle, I have obtained best results by inclining the surface 8 at an angle of approximately 18 degrees to the longitudinal axis of the shank and inclining the bottom of the projection 24 at approximately 15 degrees. This arrangement provides a positive clamping action on the cutting bit between the bearing surface 8 of the tool shank and the projection 24 of the clamp 22. The clamping action together with the serrations 18 and 20 insures positive retention of the cutting bit 10 on the tool shank. The clamping action exerted between the projection 24 and the bearing surface 8 may be varied, if desired, for different cutting operations by varying the acute angles of inclination of the bearing surface 8 and the bottom surface of the projection 24. I have found it preferable to incline the bottom of the projection 24 approximately 3 degrees less than the angle of inclination of the bearing surface 8.

The upper surface 36 of the main body of the lock 22 is preferably slightly higher than the upper surface 38 of the cutting bit 10 to augment the chip breaking action of the groove 16. The upper surface of the projection 24 is tapered downwardly and may be covered with a protective layer 40 of stellite or comparable material.

The cutting bit 10 may be easily removed from the shank 4 by loosening the set screw until the clamping member 22 may be raised a sufficient distance from the shank to permit slipping out of the cutting bit from under the projection 24. A replacement cutting bit is then inserted in place of the one removed and secured in position by tightening the set screw 30. Thus, there is no necessity for disturbing the mounting of the tool shank itself when it is desired to change the cutting bit.

While one embodiment of my invention has been shown and described, it will be apparent that other adaptations and modifications may be made without departing from the scope of the following claims.

I claim:

1. A cutting tool comprising a shank, a bit supporting surface at one end of the shank extending upwardly at an acute angle to the longitudinal axis of the shank toward the end of the shank, a cutting bit disposed on said supporting surface, matching serrations on the contacting surfaces of said cutting bit and shank having their grooves extending longitudinally of the shank, a clamping member removably mounted on said shank with a projecting portion thereof engaging the top of said cutting bit to lock the same in position, the contacting surfaces of said clamping member and cutting bit being arranged at an angle of inclination less than that of the bit supporting surface, a raised portion on the bottom of the projecting portion of said clamping member adjacent each side of its bit bearing surface, a raised central portion on the bottom of said clamping member adjacent the edge thereof remote from said cutting bit, and means for mounting said clamping member on said shank.

2. A cutting tool as defined by claim 1 characterized by said cutting bit having a transverse groove in the upper surface thereof adjacent its cutting edge for breaking chips removed by said cutting edge.

3. A cutting tool as defined by claim 1 characterized by a transverse groove in the upper surface of said cutting bit adjacent its cutting edge, the upper surface of said projecting portion being disposed for the most part in a horizontal plane above the upper surface of said cutting bit, and an inclined surface on the end of said projecting portion adjacent said cutting bit extending downwardly toward said cutting bit.

4. A cutting tool as defined by claim 1 characterized by said clamping member having a raised vertical bearing surface on the end thereof remote from said projecting portion.

References Cited in the file of this patent

UNITED STATES PATENTS

| | | |
|---|---|---|
| 2,062,607 | Reaney | Dec. 1, 1936 |
| 2,140,941 | Reaney | Dec. 20, 1938 |
| 2,150,561 | Reaney | Mar. 14, 1939 |
| 2,176,265 | Luers | Oct. 17, 1939 |
| 2,181,023 | Moore | Nov. 21, 1939 |
| 2,203,104 | Reaney | June 4, 1940 |
| 2,255,737 | Severson | Sept. 9, 1941 |
| 2,623,272 | Greenleaf | Dec. 30, 1952 |